(12) United States Patent
Wang et al.

(10) Patent No.: US 12,058,526 B2
(45) Date of Patent: Aug. 6, 2024

(54) MULTI-BAND COMMUNICATION METHOD AND APPARATUS

(71) Applicant: HUAWEI TECHNOLOGIES CO., LTD., Guangdong (CN)

(72) Inventors: Ying Wang, Shenzhen (CN); Yunbo Li, Shenzhen (CN); Mao Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 17/392,761

(22) Filed: Aug. 3, 2021

(65) Prior Publication Data
US 2021/0368343 A1    Nov. 25, 2021

Related U.S. Application Data

(63) Continuation of application No. PCT/CN2020/072965, filed on Jan. 19, 2020.

(30) Foreign Application Priority Data

Feb. 3, 2019 (CN) .......................... 201910109016.9

(51) Int. Cl.
*H04W 12/50* (2021.01)
*H04W 12/069* (2021.01)
*H04W 88/06* (2009.01)

(52) U.S. Cl.
CPC ......... *H04W 12/50* (2021.01); *H04W 12/069* (2021.01); *H04W 88/06* (2013.01)

(58) Field of Classification Search
CPC ... H04W 12/50; H04W 12/069; H04W 88/06; H04W 84/12; H04W 12/06; H04W 36/0061; H04W 76/19; H04W 88/10

USPC .......................................................... 455/411
See application file for complete search history.

(56) References Cited

U.S. PATENT DOCUMENTS

2010/0332822 A1    12/2010    Liu et al.
2017/0019785 A1    1/2017    Liu et al.

FOREIGN PATENT DOCUMENTS

| CN | 101207914 A | * | 6/2008 |
| CN | 101207914 A |   | 6/2008 |
| CN | 101860963 A |   | 10/2010 |
| CN | 102223638 A |   | 10/2011 |

(Continued)

OTHER PUBLICATIONS

Extended European Search Report issued in European Application No. 20748033.6 on Jan. 4, 2022, 13 pages.

(Continued)

*Primary Examiner* — Tanmay K Shah
(74) *Attorney, Agent, or Firm* — Fish & Richardson P.C.

(57) ABSTRACT

This application provides an example multi-band communication method and an example apparatus. One example method includes a first device receives a first frame sent by a second device, where the first frame carries request information used to request to perform authentication, association in at least two bands, or reassociation in the at least two bands. The example method also includes based on the request information carried in the first frame, the first device authenticates, the first device is associated with the second device in the at least two bands, or the first device is reassociated with the second device in the at least two bands.

20 Claims, 7 Drawing Sheets

(56) References Cited

FOREIGN PATENT DOCUMENTS

| CN | 102461329 A | 5/2012 |
|----|-------------|--------|
| JP | 2012503944 A | 2/2012 |
| JP | 2012531817 A | 12/2012 |
| KR | 20120047915 A | 5/2012 |
| WO | 2020050773 A1 | 3/2020 |

OTHER PUBLICATIONS

Office Action in Japanese Appln. No. 2021-544836, dated Sep. 20, 2022, 8 pages (with English translation).

Ramani et al., "SyncScan: Practical Fast Handoff for 802.11 Infrastructure Networks," Proceedings IEEE 24th Annual Joint Conference of the IEEE Computer and Communications Societies, Aug. 2005, 10 pages.

Hua et al., "A Physical Layer Solution for Tomlinson—Harashima Precoding in the framework of LTE-Advanced," 2012 IEEE Globecom Workshops, Dec. 2012, 6 pages.

IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 2016, 3534 pages.

PCT International Search Report and Written Opinion issued in International Application No. PCT/CN2020/072965 on Mar. 31, 2020, 17 pages (with English translation).

Office Action issued in Chinese Application No. 201910109016.9 on Jul. 4, 2022, 14 pages (with English translation).

Office Action in Korean Appln. No. 10-2021-7027607, dated Jan. 24, 2023, 8 pages (with English translation).

\* cited by examiner

MULTI-BAND COMMUNICATION METHOD AND APPARATUS

CROSS-REFERENCE TO RELATED APPLICATIONS

This application is a continuation of International Application No. PCT/CN2020/072965, filed on Jan. 19, 2020, which claims priority to Chinese Patent Application No. 201910109016.9, filed on Feb. 3, 2019. The disclosures of the aforementioned applications are hereby incorporated by reference in their entireties

TECHNICAL FIELD

This application relates to the wireless communications field, and more specifically, to a multi-band communication method and apparatus.

BACKGROUND

The institute of electrical and electronics engineers (institute of electrical and electronics engineers, IEEE) 802.11 is one of current mainstream wireless local area network (wireless local area network, WLAN) standards, and has been widely used in commercial applications over the past decade. Various versions of the IEEE 802.11 standard cover transmission protocols for a 2.4 GHz band, a 5 GHz band, a 60 GHz band, and a 6 GHz band.

In addition, with continuous development of transmission protocols for various bands, a quantity and types of multi-band devices increase accordingly, for example, a dual-band device that supports the 802.11n standard and works in the 2.4 GHz band and the 5 GHz band, a tri-band device that supports the 802.11n standard or the 802.11ax standard and works in the 2.4 GHz band and the 5 GHz band, and a tri-band device that supports the 802.11ad standard and works in the 2.4 GHz band, the 5 GHz band, and the 60 GHz band.

With an increasing quantity and increasing types of multi-band devices, how to improve authentication and association efficiency of a multi-band device becomes an urgent problem to be resolved.

SUMMARY

This application provides a multi-band communication method and apparatus, to improve authentication and association efficiency of a multi-band device.

According to a first aspect, a multi-band communication method is provided, including: A first device receives a first frame sent by a second device, where the first frame carries request information used to request to perform authentication, association, or reassociation in at least two bands. The first device authenticates, is associated with, or is reassociated with the second device in the at least two bands based on the request information.

In the method in this embodiment of this application, the first frame carries the request information used to request to perform authentication, association, or reassociation in the at least two bands, and the first device can authenticate, be associated with, or be reassociated with the second device in the at least two bands through one information exchange based on the request information, so that an authentication and association latency of a multi-band device can be reduced, thereby improving authentication and association efficiency of the multi-band device.

In some possible implementations, the request information includes at least two request bits, the at least two request bits are in a one-to-one correspondence with the at least two bands, and each request bit is used to request to perform authentication, association, or reassociation in a corresponding band.

In the method in this embodiment of this application, the at least two request bits are in a one-to-one correspondence with the at least two bands, and performing authentication, association, or reassociation in the corresponding band can be more flexibly requested by using a request bit corresponding to each band.

In some possible implementations, the first frame includes at least two first elements, and each first element carries a request bit for one band.

In the method in this embodiment of this application, each first element carries the request bit for the corresponding band, so that the first device separately obtains the request bit corresponding to each band.

In some possible implementations, the first element is a multi-band element or a neighbor report element.

In some possible implementations, when the first element is the multi-band element, the request bit is located in one of the following items: a reserved bit of a multi-band control field in the multi-band element, a reserved bit of a multi-band connection capability field in the multi-band element, or a newly added field in the multi-band element.

In the method in this embodiment of this application, information in the multi-band element is information about the corresponding band, and the request bit is located in the multi-band element of the corresponding band, so that the first device obtains the request bit while obtaining the information in the multi-band element of the corresponding band, thereby improving system transmission efficiency.

In some possible implementations, when the first element is the neighbor report element, the request bit is located in one of the following items: a reserved bit of a basic service set identifier information field in the neighbor report element, an optional subelement field in the neighbor report element, or a newly added field in the neighbor report element.

In the method in this embodiment of this application, information in the neighbor report element is information about the corresponding band, and the request bit is located in the neighbor report element of the corresponding band, so that the first device obtains the request bit while obtaining the information in the neighbor report element of the corresponding band, thereby improving system transmission efficiency.

In some possible implementations, the method further includes: The first device sends a second frame to the second device, where the second frame carries response information used to respond that the first device has authenticated, been associated with, or been reassociated with the second device.

In the method in this embodiment of this application, after completing authentication on, association, or reassociation with the second device, the first device sends the response information to the second device, to notify the second device that authentication, association, or reassociation has been completed, so that system transmission reliability can be improved.

According to a second aspect, a multi-band communication method is provided, including: A first device receives a third frame sent by a second device, where the third frame carries at least two neighbor report elements, each neighbor report element corresponds to one band, and the neighbor report element includes a pairwise cipher suite list of the corresponding band. The first device performs a handshake with the second device in at least two bands based on the third frame.

In the method in this embodiment of this application, because the neighbor report element can already function as a multi-band element, the first device performs the handshake with the second device in the at least two bands based on the at least two neighbor report elements, so that redundant information between the multi-band element and the neighbor report element can be reduced, thereby reducing system resource overheads.

In some possible implementations, the pairwise cipher suite includes a pairwise cipher suite list. Optionally, the pairwise cipher suite may further include a pairwise cipher suite count.

In some possible implementations, the third frame further carries request information used to request to perform the handshake in the at least two bands. The first device performs the handshake with the second device in the at least two bands based on the request information and at least two pairwise cipher suites.

In some possible implementations, the request information includes at least two request bits, the at least two request bits are in a one-to-one correspondence with the at least two bands, and each request bit is used to request to perform a handshake in a corresponding band.

In some possible implementations, each neighbor report element carries the request bit for the corresponding band.

In some possible implementations, the request bit is located in one of the following items: a reserved bit of a basic service set identifier information field in the neighbor report element, an optional subelement field in the neighbor report element, or a newly added field in the neighbor report element.

In some possible implementations, the method further includes: The first device obtains indication information, where the indication information is used to indicate whether the first device can perform the handshake with the second device in the at least two bands.

According to a third aspect, a multi-band communication method is provided, including: A second device generates a first frame, where the first frame carries request information used to request to perform authentication, association, or reassociation in at least two bands. The second device sends the first frame to a first device.

In the method in this embodiment of this application, the second device sends the first frame to the first device, where the first frame carries the request information used to request to perform authentication, association, or reassociation in the at least two bands, so that the first device can authenticate, be associated with, or be reassociated with the second device in the at least two bands through one time of information exchange, and an authentication and association latency of a multi-band device can be reduced. Therefore, authentication and association efficiency of the multi-band device can be improved.

In some possible implementations, the request information includes at least two request bits, the at least two request bits are in a one-to-one correspondence with the at least two bands, and each request bit is used to request to perform authentication, association, or reassociation in a corresponding band.

In the method in this embodiment of this application, the at least two request bits are in a one-to-one correspondence with the at least two bands, and performing authentication, association, or reassociation in the corresponding band can be more flexibly requested by using a request bit corresponding to each band.

In some possible implementations, the first frame includes at least two first elements, and each first element carries a request bit for one band.

In the method in this embodiment of this application, each first element carries the request bit for the corresponding band, so that the first device separately obtains the request bit corresponding to each band.

In some possible implementations, the first element is a multi-band element or a neighbor report element.

In some possible implementations, when the first element is the multi-band element, the request bit is located in one of the following items: a reserved bit of a multi-band control field in the multi-band element, a reserved bit of a multi-band connection capability field in the multi-band element, or a newly added field in the multi-band element.

In the method in this embodiment of this application, information in the multi-band element is information about the corresponding band, and the request bit is located in the multi-band element of the corresponding band, so that the first device obtains the request bit while obtaining the information in the multi-band element of the corresponding band, thereby improving system transmission efficiency.

In some possible implementations, when the first element is the neighbor report element, the request bit is located in one of the following items: a reserved bit of a basic service set identifier information field in the neighbor report element, an optional subelement field in the neighbor report element, or a newly added field in the neighbor report element.

In the method in this embodiment of this application, information in the neighbor report element is information about the corresponding band, and the request bit is located in the neighbor report element of the corresponding band, so that the first device obtains the request bit while obtaining the information in the neighbor report element of the corresponding band, thereby improving system transmission efficiency.

In some possible implementations, the method further includes: The second device receives a second frame sent by the first device, where the second frame carries response information used to respond that the first device has authenticated, been associated with, or been reassociated with the second device.

In the method in this embodiment of this application, after completing authentication on, association, or reassociation with the second device, the first device sends the response information to the second device, to notify the second device that authentication, association, or reassociation has been completed, so that system transmission reliability can be improved.

According to a fourth aspect, a multi-band communication method is provided, including: A second device generates a third frame, where the third frame carries at least two neighbor report elements, each neighbor report element corresponds to one band, and the neighbor report element includes a pairwise cipher suite list of the corresponding band. The second device sends the third frame to a first device.

In the method in this embodiment of this application, because the neighbor report element can already function as a multi-band element, the second device sends the first frame to the first device, so that the first device can perform a handshake with the second device in the at least two bands based on the at least two neighbor report elements, so that redundant information between the multi-band element and the neighbor report element can be reduced, thereby reducing system resource overheads.

In some possible implementations, the pairwise cipher suite includes a pairwise cipher suite list. Optionally, the pairwise cipher suite may further include a pairwise cipher suite count.

In some possible implementations, the third frame further carries request information used to request to perform a handshake in the at least two bands.

In some possible implementations, the request information includes at least two request bits, the at least two request bits are in a one-to-one correspondence with the at least two bands, and each request bit is used to request to perform a handshake in a corresponding band.

In some possible implementations, each neighbor report element carries the request bit for the corresponding band.

In some possible implementations, the request bit is located in one of the following items: a reserved bit of a basic service set identifier information field in the neighbor report element, an optional subelement field in the neighbor report element, or a newly added field in the neighbor report element.

In some possible implementations, the method further includes: The second device obtains indication information, where the indication information is used to indicate whether the first device can perform the handshake with the second device in the at least two bands.

According to a fifth aspect, a multi-band communications apparatus is provided, and is configured to perform the method in any one of the first aspect or the possible implementations of the first aspect. Specifically, the apparatus includes a unit configured to perform the method in any one of the first aspect or the possible implementations of the first aspect.

According to a sixth aspect, a multi-band communications apparatus is provided, and is configured to perform the method in any one of the second aspect or the possible implementations of the second aspect. Specifically, the apparatus includes a unit configured to perform the method in any one of the second aspect or the possible implementations of the second aspect.

According to a seventh aspect, a multi-band communications apparatus is provided, and is configured to perform the method in any one of the third aspect or the possible implementations of the third aspect. Specifically, the apparatus includes a unit configured to perform the method in any one of the third aspect or the possible implementations of the third aspect.

According to an eighth aspect, a multi-band communications apparatus is provided, and is configured to perform the method in any one of the fourth aspect or the possible implementations of the fourth aspect. Specifically, the apparatus includes a unit configured to perform the method in any one of the fourth aspect or the possible implementations of the fourth aspect.

According to a ninth aspect, a multi-band communications apparatus is provided. The apparatus includes a transceiver and a processor. The processor is configured to: invoke an instruction stored in a memory from the memory and run the instruction, to perform the method in any one of the first aspect or the possible implementations of the first aspect.

Optionally, the multi-band communications apparatus further includes the memory, and the memory is configured to store the instruction.

Optionally, there are one or more processors, and there are one or more memories.

In a specific implementation process, the memory may be a non-transitory (non-transitory) memory, for example, a read-only memory (read-only memory, ROM). The memory and the processor may be integrated on a same chip, or may be separately disposed. A type of the memory and a manner of disposing the memory and the processor are not limited in this embodiment of this application.

According to a tenth aspect, a multi-band communications apparatus is provided. The apparatus includes a transceiver and a processor. The processor is configured to: invoke an instruction stored in a memory from the memory and run the instruction, to perform the method in any one of the second aspect or the possible implementations of the second aspect.

Optionally, the multi-band communications apparatus further includes the memory, and the memory is configured to store the instruction.

Optionally, there are one or more processors, and there are one or more memories.

In a specific implementation process, the memory may be a non-transitory (non-transitory) memory, for example, a read-only memory (read-only memory, ROM). The memory and the processor may be integrated on a same chip, or may be separately disposed. A type of the memory and a manner of disposing the memory and the processor are not limited in this embodiment of this application.

According to an eleventh aspect, a multi-band communications apparatus is provided. The apparatus includes a transceiver and a processor. The processor is configured to: invoke an instruction stored in a memory from the memory and run the instruction, to perform the method in any one of the third aspect or the possible implementations of the third aspect.

Optionally, the multi-band communications apparatus further includes the memory, and the memory is configured to store the instruction.

Optionally, there are one or more processors, and there are one or more memories.

In a specific implementation process, the memory may be a non-transitory (non-transitory) memory, for example, a read-only memory (read-only memory, ROM). The memory and the processor may be integrated on a same chip, or may be separately disposed. A type of the memory and a manner of disposing the memory and the processor are not limited in this embodiment of this application.

According to a twelfth aspect, a multi-band communications apparatus is provided. The apparatus includes a transceiver and a processor. The processor is configured to: invoke an instruction stored in a memory from the memory and run the instruction, to perform the method in any one of the fourth aspect or the possible implementations of the fourth aspect.

Optionally, the multi-band communications apparatus further includes the memory, and the memory is configured to store the instruction.

Optionally, there are one or more processors, and there are one or more memories.

In a specific implementation process, the memory may be a non-transitory (non-transitory) memory, for example, a read-only memory (read-only memory, ROM). The memory and the processor may be integrated on a same chip, or may be separately disposed. A type of the memory and a manner of disposing the memory and the processor are not limited in this embodiment of this application.

According to a thirteenth aspect, a multi-band communications system is provided. The system includes the apparatus in any one of the fifth aspect or the possible implementations of the fifth aspect and the apparatus in any one of the seventh aspect or the possible implementations of the seventh aspect;

the system includes the apparatus in any one of the sixth aspect or the possible implementations of the sixth aspect and the apparatus in any one of the eighth aspect or the possible implementations of the eighth aspect;

the system includes the apparatus in any one of the ninth aspect or the possible implementations of the ninth aspect and the apparatus in any one of the eleventh aspect or the possible implementations of the eleventh aspect; or the system includes the apparatus in any one of the tenth aspect or the possible implementations of the tenth aspect and the apparatus in any one of the twelfth aspect or the possible implementations of the twelfth aspect.

According to a fourteenth aspect, a computer program product is provided. The computer program product includes computer program code. When the computer program code is run on a computer, the computer is enabled to perform the methods in the foregoing aspects.

According to a fifteenth aspect, a computer-readable medium is provided, and is configured to store a computer program. The computer program includes an instruction used to perform the methods in the foregoing aspects.

According to a sixteenth aspect, a chip system is provided, including: an input interface, an output interface, and a processor. The input interface, the output interface, and the processor are connected to each other through an internal connection path, and the processor is configured to: invoke an instruction stored in a memory from the memory and run the instruction, to perform the method in any one of the foregoing aspects or the possible implementations of the foregoing aspects.

Optionally, the chip system further includes the memory, and the memory is configured to store the instruction.

Optionally, there are one or more processors, and there are one or more memories.

In a specific implementation process, the memory may be a non-transitory (non-transitory) memory, for example, a read-only memory (read-only memory, ROM). The memory and the processor may be integrated on a same chip, or may be separately disposed. A type of the memory and a manner of disposing the memory and the processor are not limited in this embodiment of this application.

In the method in embodiments of this application, the first frame carries the request information used to request to perform authentication, association, or reassociation in the at least two bands, and the first device can authenticate, be associated with, or be reassociated with the second device in the at least two bands through one time of information exchange based on the request information, so that the authentication and association latency of the multi-band device can be reduced, thereby improving the authentication and association efficiency of the multi-band device.

DESCRIPTION OF EMBODIMENTS

Figure 1:
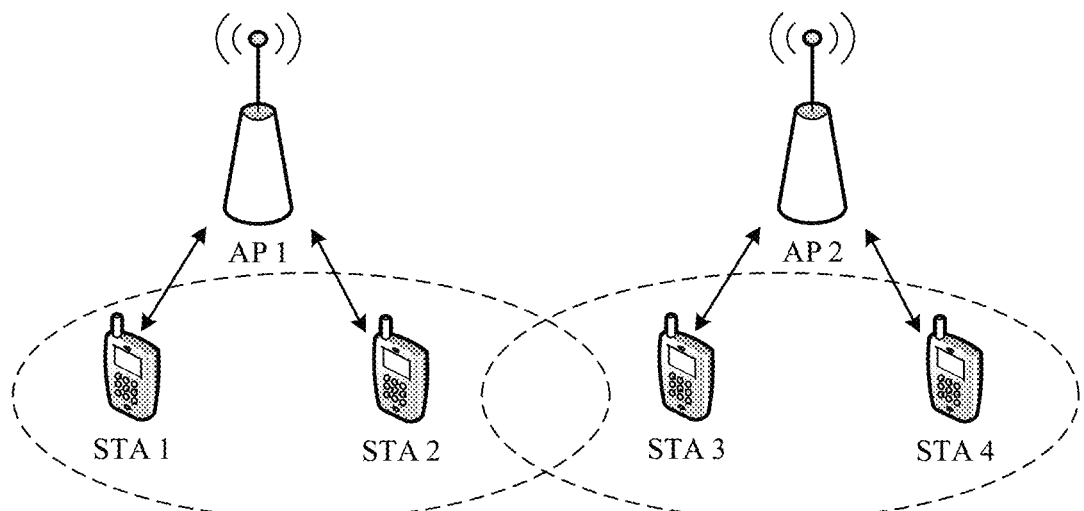
FIG. 1 is a schematic diagram of a communications system according to an embodiment of this application.

The following describes the technical solutions in this application with reference to the accompanying drawings.

The technical solutions in embodiments of this application may be applied to various communications systems, for example, a wireless local area network (wireless local area network, WLAN) system. Optionally, the embodiments of this application may be further applied to another system, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a 5th generation (5th generation, 5G) system, or a new radio (new radio, NR) system.

Only the WLAN system is used as an example below to describe an application scenario in the embodiments of this application and a method in the embodiments of this application.

Specifically, the embodiments of this application may be applied to a wireless local area network (Wireless Local Area Network, WLAN), and the embodiments of this application may be applied to any protocol in the institute of electrical and electronics engineers (institute of electrical and electronics engineers, IEEE) 802.11 series protocols currently used by the WLAN. The WLAN may include one or more basic service sets (basic service set, BSS). Network nodes in the basic service set include an access point (access point, AP) and a station (station, STA). Based on an original BSS, a personal basic service set (personal basic service set, PBSS) and a personal basic service set control point (PBSS control point, PCP) are introduced in the IEEE 802.11ad. Each personal basic service set may include one AP/PCP and a plurality of stations associated with the AP/PCP. It should be understood that in the embodiments of this application, a device that communicates with the station may be an AP or a PCP. For ease of description, only communication between the AP and the station is used as an example below for description. A behavior of communication between the PCP and the station is similar to that of communication between the AP and the station.

It should be understood that in the embodiments of this application, a first device and/or a second device each may be a STA in the WLAN. The STA may also be referred to as a system, a user unit, an access terminal, a mobile station, a mobile console, a remote station, a remote terminal, a mobile device, a user terminal, a terminal, a wireless communications device, a user agent, a user apparatus, or user equipment (user equipment, UE). The STA may be a wireless communications chip, a wireless sensor, or a wireless communications terminal. For example, the STA may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communications device supporting a Wi-Fi communication function, or a computer supporting a Wi-Fi communication function. Optionally, the STA may support a plurality of WLAN standards such as 802.11ax, 802.11ac, 802.11ad, 802.11ay, 802.11n, 802.11g, 802.11b, and 802.11a.

In addition, in the embodiments of this application, the first device and/or the second device each may alternatively be an AP in the WLAN. The AP may be configured to: communicate with an access terminal through the wireless local area network, and transmit data of the access terminal to a network side, or transmit data from a network side to the access terminal. The AP may also be referred to as a wireless access point, a hotspot, or the like. The AP may be an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (Wireless Fidelity, Wi-Fi) chip. Optionally, the AP may be a device that supports the 802.11ax standard. Further optionally, the AP may support the plurality of WLAN standards such as 802.11ax, 802.11ac, 802.11ad, 802.1 lay, 802.11n, 802.11g, 802.11b, and 802.11a.

In the embodiments of this application, the first device or the second device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). An operating system may be any one or more computer operating systems that implement service processing by using a process (process), for example, a Linux operating system, a Unix operating system, an Android operating system, an iOS operating system, or a Windows operating system. An application layer includes applications such as a browser, an address book, word processing software, and instant communications software. In addition, a specific structure of an execution body of the method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the AP or the STA, or a functional module that can invoke and execute the program in the AP or the STA.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (compact disc, CD), a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry an instruction and/or data.

FIG. 1 is a schematic diagram of an application scenario according to an embodiment of this application. A system in the scenario shown in FIG. 1 may be a WLAN system. The WLAN system in FIG. 1 may be a WLAN scenario including a plurality of basic service sets (basic service set, BSS). The WLAN system may include one or more APs and one or more STAs. Two APs (an AP 1 and an AP 2) and four STAs (a STA 1, a STA 2, a STA 3 and a STA 4) are used as an example in FIG. 1. Wireless communication may be performed between APs, between an AP and a STA, and between STAs by using various standards.

It should be understood that communication in this specification may be direct communication, or may be indirect communication. This is not limited in this embodiment of this application. For example, assuming that the STA 3 does not belong to a basic service set of the AP 1, the AP 1 may first send information to the AP 2, and then the AP 2 sends the information to the STA 3, thereby implementing indirect communication between the AP 1 and the STA 3. Similarly, the STA 1 and the STA 4 may also perform indirect communication through the AP 1 or the AP 2. Details are not described herein again.

The basic service set mentioned above is a basic constituent part of an 802.11 local area network. One BSS includes one access point (access point, AP) and several stations (station, STA). All the STAs can directly communicate with each other in the BSS, but need to use the AP in the BSS when communicating with a STA outside the BSS.

Figure 2:
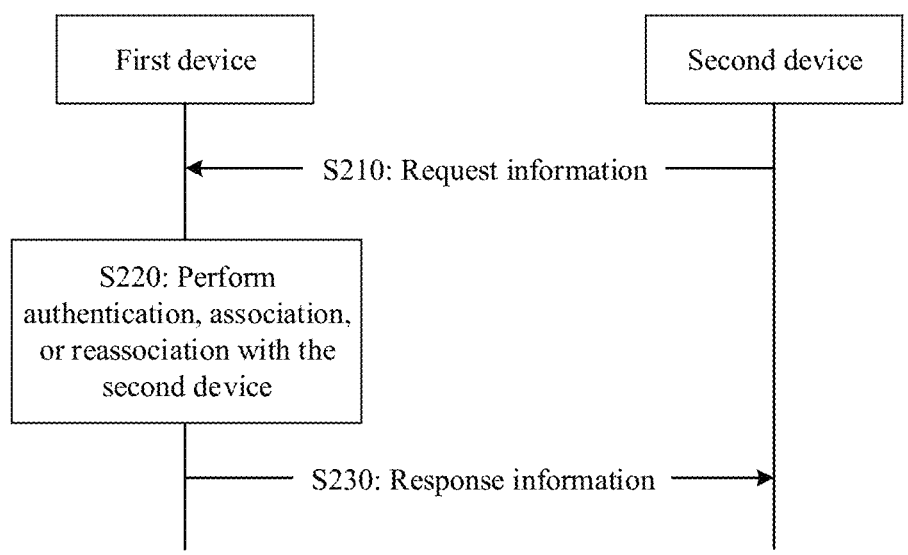
FIG. 2 is a flowchart of an example of a multi-band communication method according to an embodiment of this application.

FIG. 2 is a flowchart of an example of a multi-band communication method 200 according to an embodiment of this application. It should be understood that a first device in the method shown in FIG. 2 may correspond to the AP or the STA in the system 100 shown in FIG. 1, and a second device may also correspond to the AP or the STA shown in FIG. 1.

S210: The first device receives a first frame sent by the second device, where the first frame carries request information used to request to perform authentication, association, or reassociation in at least two bands.

The at least two bands may be at least two of a plurality of bands. For example, the at least two bands may include one or more of 2.4 GHz, 5 GHz, 60 GHz, and 6 GHz. Alternatively, the at least two bands may include two or more identical bands. For example, the at least two bands may include two or more 2.4 GHz. Alternatively, the at least two bands may include two or more 5 GHz, two or more 60 GHz, or two or more 6 GHz. Details are not described herein. In addition, the at least two bands may also include another band. This is not limited in this embodiment of this application.

Optionally, the first frame may be an authentication frame (authentication frame), an association request frame (association request frame), or a reassociation request frame (reassociation request frame).

For example, when the first frame carries request information used to request to perform authentication in at least two bands, the first frame may be an authentication frame. When the first frame carries request information used to request to perform association in at least two bands, the first frame may be an association request frame. When the first frame carries request information used to request to perform reassociation in at least two bands, the first frame may be a reassociation request frame.

In a possible implementation, the second device may request, by using the request information, the first device to perform authentication, association, or reassociation in the at least two bands at the same time.

It should be understood that performing authentication, association, or reassociation in the at least two bands at the same time may mean that the second device may request, by using the request information, the first device to perform, after receiving the first frame, authentication, association, or reassociation in the at least two bands based on the request information. That is, authentication, association, or reassociation in the at least two bands can be implemented through one time of exchange based on the request information.

For example, the request information is used to request to perform authentication in the at least two bands. The second device sends the first frame to the first device, where the first frame may carry the request information used to request to perform authentication in the at least two bands. Correspondingly, after receiving the first frame, the first device may perform authentication in the at least two bands based on the request information, that is, authentication in the at least two bands can be implemented by using the first frame. A process of requesting, by using the request information, to perform association or reassociation in the at least two bands is similar to this. Details are not described herein again.

In a possible implementation, the request information may include at least two request bits, the at least two request bits may be in a one-to-one correspondence with the at least two bands, and each request bit may be used to request to perform authentication, association, or reassociation in a corresponding band.

For example, the at least two bands may include 2.4 GHz, 5 GHz, and 60 GHz. In this case, the request information may include three request bits, and the three request bits may be in a one-to-one correspondence with 2.4 GHz, 5 GHz, and 60 GHz. One of the three request bits may correspond to 2.4 GHz, and is used to request to perform authentication, association, or reassociation at 2.4 GHz. Another one of the three request bits may correspond to 5 GHz, and is used to request to perform authentication, association, or reassociation at 5 GHz. Still another one of the three request bits may correspond to 60 GHz, and is used to request to perform authentication, association, or reassociation at 60 GHz.

Optionally, the request bit may include at least one bit.

For example, the request bit may correspond to 2.4 GHz, and the request bit may include one bit. In this case, if the request bit is 1, the request bit is used to request to perform authentication, association, or reassociation at 2.4 GHz. If the request bit is 0, the request bit is not used to request to perform authentication, association, or reassociation at 2.4 GHz.

It should be understood that the request information may be used to request only a part of bands in the at least two bands.

For example, the at least two bands may include 2.4 GHz, 5 GHz, and 60 GHz, and the request information may be used to perform authentication, association, or reassociation at only 2.4 GHz and 5 GHz. Optionally, in this case, the request bit corresponding to 2.4 GHz and the request bit corresponding to 5 GHz may be 1, and the request bit corresponding to 60 GHz may be 0.

In a possible implementation, the first frame may include at least two first elements, and each first element carries a request bit for one band.

For example, the at least two bands may include 2.4 GHz, 5 GHz, and 60 GHz. In this case, the first frame may include three first elements, where one first element may correspond to 2.4 GHz and is used to carry the request bit for 2.4 GHz, another first element may correspond to 5 GHz and is used to carry the request bit for 5 GHz, and still another first element may correspond to 60 GHz and is used to carry the request bit for 60 GHz.

Optionally, the request bit corresponding to 2.4 GHz and the request bit corresponding to 5 GHz may be 1, and are used to request to perform authentication, association, or reassociation at 2.4 GHz and 5 GHz. The request bit corresponding to 60 GHz may be 0, and the request bit corresponding to 60 GHz is not used to request to perform authentication, association, or reassociation at 60 GHz. In this case, information carried in the first element corresponding to 60 GHz may be used to indicate a transmission capability of the second device at 60 GHz.

In a possible implementation, the first element may be a multi-band element (multi-band element).

Figure 3A:
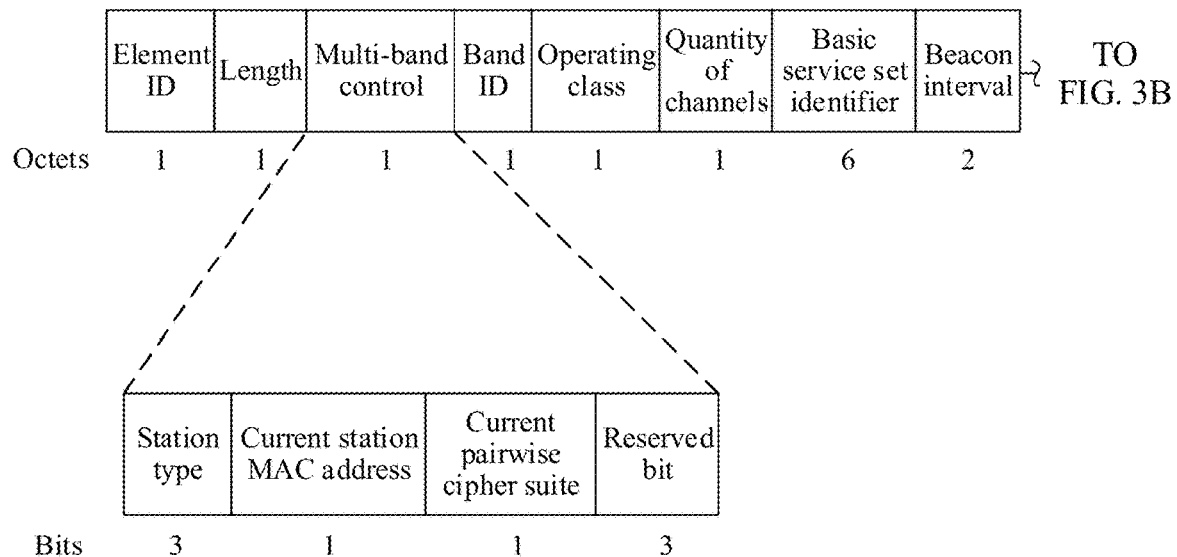
FIG. 3A and FIG. 3B are a schematic structural diagram of a first element according to an embodiment of this application.
Figure 3B:
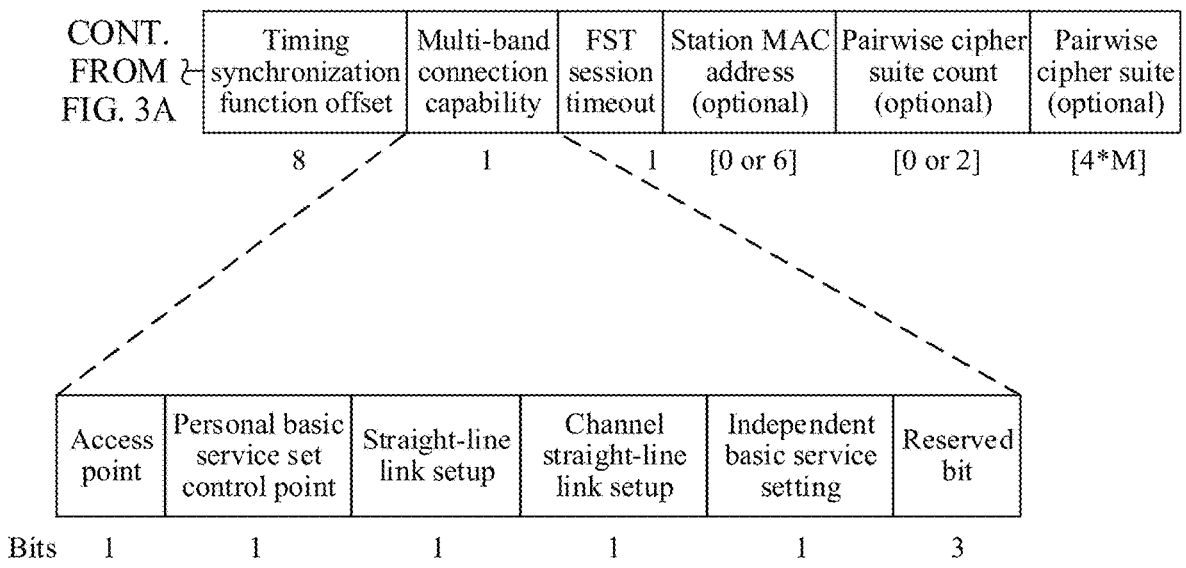

FIG. 3A and FIG. 3B are schematic structural diagrams of a first element according to an embodiment of this application. As shown in FIGS. 3A and 3B, the first element may include an element identification (ID), a length, a multi-band control, a band ID, an operating class, a quantity of channels, a basic service identifier, a beacon interval, a time synchronization function offset, a multi-band connection capability, a fast session transfer (FST) session timeout, an optional station media access control (MAC) address, an optional pairwise cipher suite count, and an optional pairwise cipher suite. The multi-bit control may include a station type, a current station MAC address, a current pairwise cipher suite, and a reserved bit. The multi-band connection capability may include an access point, a personal basic service set control point, a straight-line link setup, a channel straight-line link setup, an independent basic service setting, and a reserved bit. Optionally, as shown in FIG. 3A and FIG. 3B, when the first element is the multi-band element, the request bit may be located in a reserved bit of a multi-band control field (multi-band control field) in the multi-band element, or the request bit may be located in a multi-band connection capability field (multi-band connection capability field) in the multi-band element, or the request bit may be located in a reserved bit or a newly added field in the multi-band element.

In another possible implementation, the first element may be a neighbor report element (neighbor report element).

Figure 4:
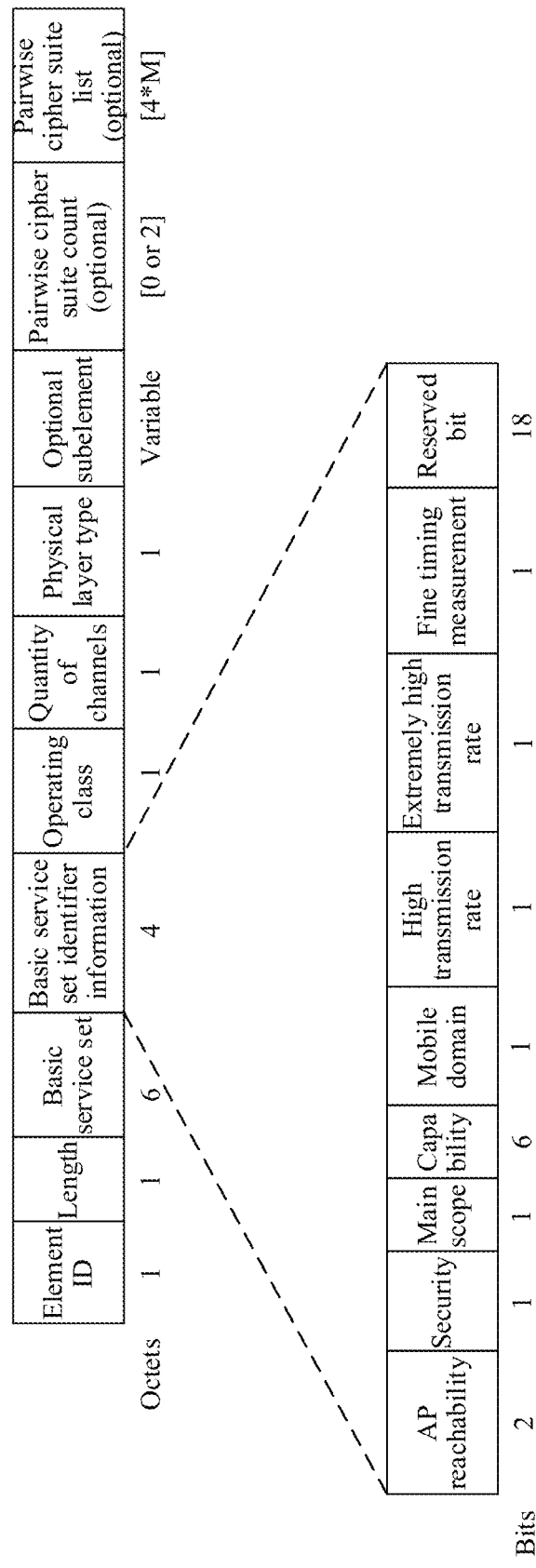
FIG. 4 is another schematic structural diagram of a first element according to an embodiment of this application.

FIG. 4 is another schematic structural diagram of a first element according to an embodiment of this application. As shown in FIG. 4, the first element may include an element ID, a length, a basic service set, basic service set identifier information, an operating class, a quantity of channels, a physical layer type, an optional subelement, an optional pairwise cipher suite count, and an optional pairwise cipher suite list. The basic service set identifier information may include AP reachability, security, a main scope, a capability, a mobile domain, a high transmission rate, am extremely high transmission rate, a fine timing measurement, and a reserved bit. Optionally, as shown in FIG. 4, when the first element is the neighbor report element, the request bit may be located in a reserved bit of a basic service set identifier information field (BSSID Information field) in the neighbor report element, or the request bit may be located in an optional subelement field (optional subelements) in the neighbor report element, or the request bit may be located in a newly added field in the neighbor report element.

S220: The first device authenticates, is associated with, or is reassociated with the second device in the at least two bands based on the request information.

Optionally, after receiving the first frame, the first device may perform authentication, association, or reassociation in the at least two bands at the same time based on the request information. That is, the first device may perform authentication, association, or reassociation in the at least two bands through one time of exchange based on the request information.

In a possible implementation, the first device may reject authentication, association, or reassociation in one or more of the at least two bands requested in the request information.

For example, the request information may be used to request to perform authentication, association, or reassociation at 2.4 GHz, 5 GHz, and 60 GHz. After receiving the first frame, the first device may reject a request for performing authentication, association, or reassociation at 2.4 GHz, and accept only a request for performing authentication, association, or reassociation at 5 GHz and 60 GHz.

Optionally, the first device may perform authentication, association, or reassociation at 5 GHz and 60 GHz, and may set the request bit corresponding to 2.4 GHz to 0.

Optionally, after S220, the method 200 may further include S230.

S230: The first device sends a second frame to the second device, where the second frame carries response information used to respond that the first device has authenticated, been associated with, or been reassociated with the second device.

Optionally, the second frame may be an authentication frame (authentication frame), an association response frame (association response frame), or a reassociation response frame (reassociation response frame).

For example, when the first device performs authentication in the at least two bands based on the request information, the second frame may be an authentication frame. When the first device performs association in the at least two bands based on the request information, the second frame may be an association response frame. When the first device performs reassociation in the at least two bands based on the request information, the second frame may be a reassociation response frame.

In a possible implementation, if refusing to perform authentication, association, or reassociation in one or more of the at least two bands requested in the request information, the first device may set the request bit corresponding to the one or more bands to 0, and send the second frame including the request bit to the second device. Optionally, the first device may alternatively set, to 1, a request bit corresponding to a band in which authentication, association, or reassociation is performed in the at least two bands.

Correspondingly, after the second device receives the second frame, the second device may determine, based on the response information, that the first device has performed authentication, association, or reassociation in a part or all of the at least two bands requested by the second device.

In this embodiment of this application, the first frame carries the request information used to request to perform authentication, association, or reassociation in the at least two bands, and the first device can authenticate, be associated with, or be reassociated with the second device in the at least two bands through one time of information exchange based on the request information, so that an authentication and association latency of a multi-band device can be reduced, thereby improving authentication and association efficiency of the multi-band device.

Figure 5:
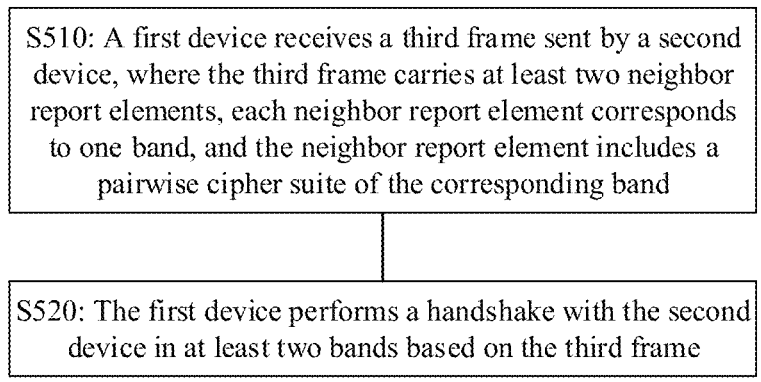
FIG. 5 is a flowchart of an example of a multi-band communication method according to another embodiment of this application.

FIG. 5 is a flowchart of an example of a multi-band communication method 500 according to an embodiment of this application. It should be understood that a first device in the method shown in FIG. 5 may correspond to the AP or the STA in the system 100 shown in FIG. 1, and a second device may also correspond to the AP or the STA shown in FIG. 1.

S510: The first device receives a third frame sent by the second device, where the third frame carries at least two neighbor report elements, each neighbor report element corresponds to one band, and the neighbor report element includes a pairwise cipher suite list of the corresponding band.

The pairwise cipher suite (pairwise cipher suite) includes a pairwise cipher suite list (pairwise cipher suite list). As shown in FIG. 4, the pairwise cipher suite may further include a pairwise cipher suite count (pairwise cipher suite count).

Optionally, the third frame may further carry request information used to request to perform a handshake in at least two bands at the same time.

It should be understood that performing the handshake in the at least two bands at the same time may mean that the second device may request, by using the request information, the first device to perform, after receiving the third frame, the handshake with the second device in the at least two bands based on the request information. That is, the handshake in the at least two bands can be implemented through one handshake based on the request information.

In a possible implementation, the request information may include at least two request bits, the at least two request bits are in a one-to-one correspondence with the at least two bands, and each request bit is used to request to perform a handshake in a corresponding band.

For example, the at least two bands may include 2.4 GHz, 5 GHz, and 60 GHz. In this case, the request information may include three request bits, and the three request bits may be in a one-to-one correspondence with 2.4 GHz, 5 GHz, and 60 GHz. One of the three request bits may correspond to 2.4 GHz, and is used to request to perform a handshake at 2.4 GHz. Another one of the three request bits may correspond to 5 GHz, and is used to request to perform a handshake at 5 GHz. Still another one of the three request bits may correspond to 60 GHz, and is used to request to perform a handshake at 60 GHz.

In a possible implementation, each neighbor report element may carry the request bit for the corresponding band.

For example, the at least two bands may include 2.4 GHz, 5 GHz, and 60 GHz. In this case, the third frame may include three neighbor report elements, where one neighbor report element may correspond to 2.4 GHz and is used to carry the request bit for 2.4 GHz, another neighbor report element may correspond to 5 GHz and is used to carry the request bit for 5 GHz, and still another neighbor report element may correspond to 60 GHz and is used to carry the request bit for 60 GHz.

In a possible implementation, as shown in FIG. 4, the request bit may be located in a reserved bit of a basic service set identifier information field in the neighbor report element, or the request bit may be located in an optional subelement field in the neighbor report element, or the request bit may be located in a newly added field in the neighbor report element.

S520: The first device performs the handshake with the second device in the at least two bands based on the third frame.

In a possible implementation, the method further includes: The first device obtains indication information, where the indication information is used to indicate whether the first device can perform the handshake with the second device in the at least two bands. For example, the first device may obtain the indication information before S510.

Optionally, the indication information may include at least one bit.

For example, the indication information may include one bit. In this case, if the indication information is 1, the indication information may be used to indicate that the first device can perform the handshake with the second device in the at least two bands at the same time, that is, the first device can perform the handshake with the second device in the at least two bands by using one handshake procedure. If the indication information is 0, the indication information may be used to indicate that the first device cannot perform the handshake with the second device in the at least two bands at the same time, that is, the first device can perform a handshake with the second device in only one band by using one handshake procedure.

In a possible implementation, the indication information may be a joint multi-band robust security network association subfield (joint multi-band robust security network association subfield).

Optionally, the indication information may be carried in a beacon frame (beacon frame), a probe response frame (probe response frame), and/or an information response frame (information response frame).

In a possible implementation, when the third frame carries the request information used to request to perform the handshake in the at least two bands and the at least two neighbor report elements, the first device may perform the handshake with the second device in the at least two bands based on the request information and at least two pairwise cipher suites. Specifically, the handshake procedure mentioned in FIG. 5 may be shown in FIG. 6.

Figure 6:
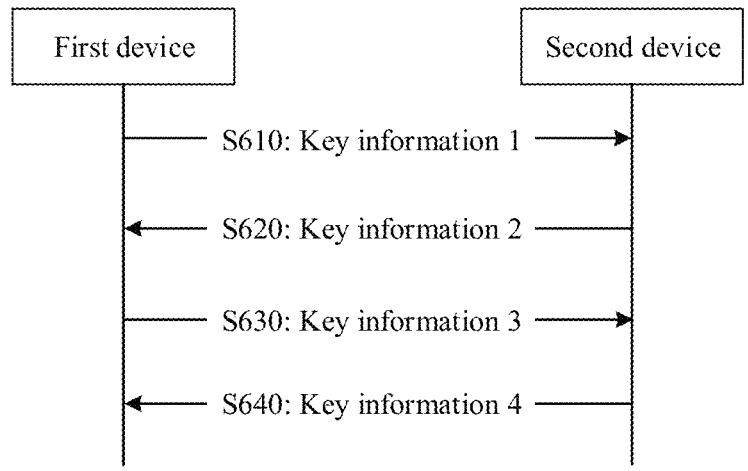
FIG. 6 is a flowchart of an example of a multi-band communication method according to another embodiment of this application.

FIG. 6 is a flowchart of an example of a multi-band communication method 600 according to an embodiment of this application. It should be understood that a first device in the method shown in FIG. 6 may correspond to the AP or the STA in the system 100 shown in FIG. 1, and a second device may also correspond to the AP or the STA shown in FIG. 1.

It should be understood that the handshake procedure in FIG. 6 may be a 4-way handshake (4-way handshake) procedure in a robust security network association (robust security network association, RSNA) framework. In addition, the handshake procedure may alternatively be a handshake procedure or another procedure in another framework. This is not limited in this embodiment of this application.

S610: The first device sends a key message 1 (key message 1) to the second device.

Optionally, after receiving the key message 1, the second device may obtain a pairwise transient key (pairwise transient key, PTK) based on the key message 1.

Optionally, before S610, the first device and the second device each may obtain a pairwise master key (pairwise master key, PMK).

In a possible implementation, the second device may obtain the PTK based on the key message 1 and the PMK.

Optionally, before S610, the second device may obtain indication information, where the indication information is used to indicate whether the first device can perform a handshake with the second device in at least two bands. Optionally, the indication information may be a joint multi-band RSNA subfield.

Optionally, if the indication information is used to indicate that the first device can perform the handshake with the second device in the at least two bands, the second device may obtain, based on the key message 1 and the PMK, PTKs corresponding to the at least two bands.

S620: The first device receives a key message 2 (key message 2) sent by the second device.

It should be understood that the key message 2 in S620 of FIG. 6 may be the third frame in S510 of FIG. 5.

For example, the key message 2 may carry at least two neighbor report elements. Optionally, the key message 2 may further carry request information used to request to perform a handshake in the at least two bands at the same time.

The at least two neighbor report elements may be in a one-to-one correspondence with the at least two bands, and each neighbor report element may include a pairwise cipher suite of a corresponding band. The request information may include at least two request bits. For specific descriptions, refer to the method in FIG. 5. Details are not described herein again.

In a possible implementation, the first device may obtain, based on the key message 2 and the PMK, PTKs corresponding to the at least two bands. The PTKs obtained in S620 may be the same as the PTKs obtained in S610.

Optionally, after S620, the method 600 may further include S630 and S640.

S630: The first device sends a key message 3 (key message 3) to the second device.

Optionally, the first device may perform encryption by using the PTKs, to obtain group temporal keys (group temporal key, GTK) corresponding to the at least two bands.

Optionally, the key message 3 may carry the GTKs corresponding to the at least two bands.

S640: The first device receives a key message 4 (key message 4) sent by the second device.

In a possible implementation, the first device may determine, based on the key message 4, that the second device has received the GTKs corresponding to the at least two bands.

In addition, for a detailed process in FIG. 6, refer to the current technology. Details are not described in this embodiment of this application.

Figure 7:
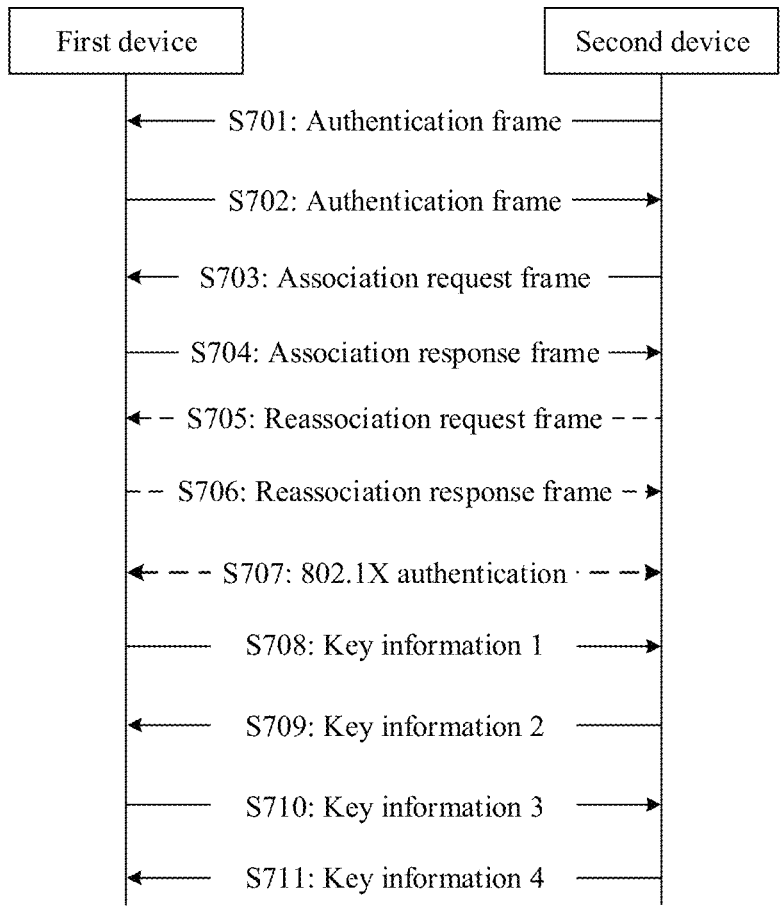
FIG. 7 is a flowchart of an example of a multi-band communication method according to another embodiment of this application.

FIG. 7 is a flowchart of an example of a multi-band communication method 700 according to an embodiment of this application. It should be understood that a first device in the method shown in FIG. 7 may correspond to the AP or the STA in the system 100 shown in FIG. 1, and a second device may also correspond to the AP or the STA shown in FIG. 1.

It should be understood that the method 700 in FIG. 7 may be an authentication association procedure in an RSNA framework. In addition, the authentication association procedure may alternatively be an authentication association procedure or another procedure in another framework. This is not limited in this embodiment of this application.

Optionally, for S701 and S702 in the method 700, refer to the method 200 in FIG. 2. Optionally, for S703 and S704 in the method 700, still refer to the method 200 in FIG. 2. Optionally, the method 700 may further include S705 and S706. Similarly, for S705 and S706, still refer to the method 200 in FIG. 2. It should be understood that S701, S702, S703, S704, S705, and/or S706 in the method 700 may also be implemented by using another method in the current technology. This is not limited in this embodiment of this application.

Optionally, the method 700 may further include S707. In S707, the first device and the second device may perform authentication in an 802.1X framework according to an extensible authentication protocol (extensible authentication protocol, EAP), to obtain a PMK. For a specific process, refer to the current technology. Details are not described herein.

Optionally, for S708, S709, S710, and/or S711 in the method 700, refer to the method 600 in FIG. 6. Details are not described herein again. It should be understood that S708, S709, S710, and/or S711 in the method 700 may also be implemented by using another method in the current technology. This is not limited in this embodiment of this application.

Figure 8:
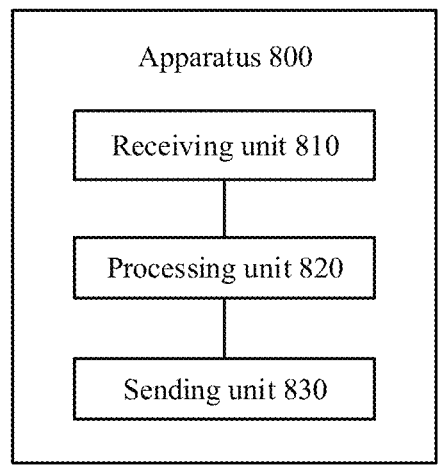
FIG. 8 is a block diagram of an example of a multi-band communications apparatus according to an embodiment of this application.

FIG. 8 is a schematic block diagram of an apparatus 800 according to an embodiment of this application. It should be understood that the apparatus 800 is merely an example. The apparatus in this embodiment of this application may further include another module or unit, may include modules having functions similar to those of the modules in FIG. 8, or may not necessarily include all the modules in FIG. 8.

A receiving unit 810 is configured to receive a first frame sent by a second device, where the first frame carries request information used to request to perform authentication, association, or reassociation in at least two bands.

A processing unit 820 is configured to authenticate, be associated with, or be reassociated with the second device in the at least two bands based on the request information.

Optionally, the request information includes at least two request bits, the at least two request bits are in a one-to-one correspondence with the at least two bands, and each request bit is used to request to perform authentication, association, or reassociation in a corresponding band.

Optionally, the first frame includes at least two first elements, and each first element carries a request bit for one band.

Optionally, the first element is a multi-band element or a neighbor report element.

Optionally, when the first element is the multi-band element, the request bit is located in one of the following items: a reserved bit of a multi-band control field in the multi-band element, a reserved bit of a multi-band connection capability field in the multi-band element, or a newly added field in the multi-band element.

Optionally, when the first element is the neighbor report element, the request bit is located in one of the following items: a reserved bit of a basic service set identifier information field in the neighbor report element, an optional subelement field in the neighbor report element, or a newly added field in the neighbor report element.

Optionally, the apparatus 800 further includes a sending unit 830, configured to send a second frame to the second device, where the second frame carries response information used to respond that the apparatus has authenticated, been associated with, or been reassociated with the second device.

Figure 9:
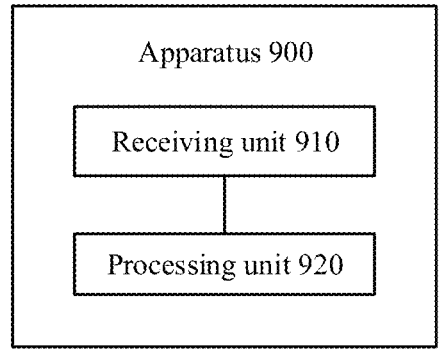
FIG. 9 is a block diagram of an example of another multi-band communications apparatus according to an embodiment of this application.

FIG. 9 is a schematic block diagram of an apparatus 900 according to an embodiment of this application. It should be understood that the apparatus 900 is merely an example. The apparatus in this embodiment of this application may further include another module or unit, may include modules having functions similar to those of the modules in FIG. 9, or may not necessarily include all the modules in FIG. 9.

A receiving unit 910 is configured to receive a third frame sent by a second device, where the third frame carries at least two neighbor report elements, each neighbor report element corresponds to one band, and the neighbor report element includes a pairwise cipher suite list of the corresponding band.

A processing unit 920 is configured to perform a handshake with the second device in at least two bands based on the third frame.

Optionally, the pairwise cipher suite includes a pairwise cipher suite list.

Optionally, the third frame further carries request information used to request to perform the handshake in the at least two bands. The processing unit is specifically configured to perform the handshake with the second device in the at least two bands based on the request information and at least two pairwise cipher suites.

Optionally, the request information includes at least two request bits, the at least two request bits are in a one-to-one correspondence with the at least two bands, and each request bit is used to request to perform a handshake in a corresponding band.

Optionally, each neighbor report element carries the request bit for the corresponding band.

Optionally, the request bit is located in one of the following items: a reserved bit of a basic service set identifier information field in the neighbor report element, an optional subelement field in the neighbor report element, or a newly added field in the neighbor report element.

Optionally, the receiving unit 910 is further configured to obtain indication information, where the indication information is used to indicate whether the apparatus can perform the handshake with the second device in the at least two bands.

Figure 10:
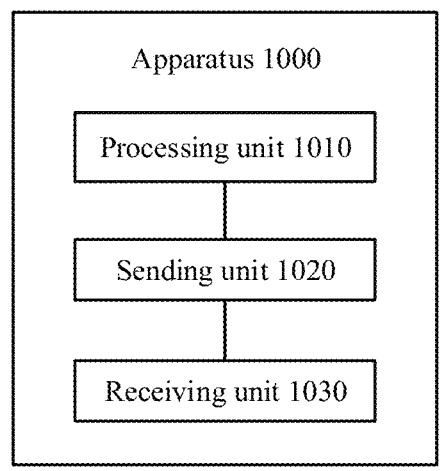
FIG. 10 is a block diagram of an example of another multi-band communications apparatus according to an embodiment of this application.

FIG. 10 is a schematic block diagram of an apparatus 1000 according to an embodiment of this application. It should be understood that the apparatus 1000 is merely an example. The apparatus in this embodiment of this application may further include another module or unit, may include modules having functions similar to those of the modules in FIG. 10, or may not necessarily include all the modules in FIG. 10.

A processing unit 1010 is configured to generate a first frame, where the first frame carries request information used to request to perform authentication, association, or reassociation in at least two bands.

A sending unit 1020 is configured to send the first frame to a first device.

Optionally, the request information includes at least two request bits, the at least two request bits are in a one-to-one correspondence with the at least two bands, and each request bit is used to request to perform authentication, association, or reassociation in a corresponding band.

Optionally, the first frame includes at least two first elements, and each first element carries a request bit for one band.

Optionally, the first element is a multi-band element or a neighbor report element.

Optionally, when the first element is the multi-band element, the request bit is located in one of the following items: a reserved bit of a multi-band control field in the multi-band element, a reserved bit of a multi-band connection capability field in the multi-band element, or a newly added field in the multi-band element.

Optionally, when the first element is the neighbor report element, the request bit is located in one of the following items: a reserved bit of a basic service set identifier information field in the neighbor report element, an optional subelement field in the neighbor report element, or a newly added field in the neighbor report element.

Optionally, the apparatus 1000 further includes a receiving unit 1030, configured to receive a second frame sent by the first device, where the second frame carries response information used to respond that the first device has authenticated, been associated with, or been reassociated with the apparatus.

Figure 11:
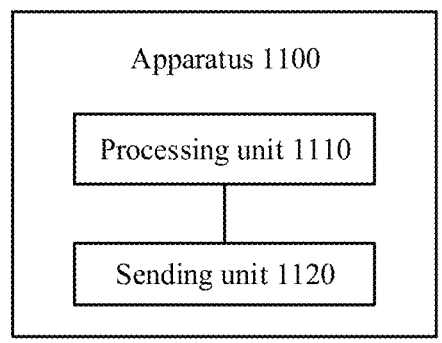
FIG. 11 is a block diagram of an example of another multi-band communications apparatus according to an embodiment of this application.

FIG. 11 is a schematic block diagram of an apparatus 1100 according to an embodiment of this application. It should be understood that the apparatus 1100 is merely an example. The apparatus in this embodiment of this application may further include another module or unit, may include modules having functions similar to those of the modules in FIG. 11, or may not necessarily include all the modules in FIG. 11.

A processing unit 1110 is configured to generate a third frame, where the third frame carries at least two neighbor report elements, each neighbor report element corresponds to one band, and the neighbor report element includes a pairwise cipher suite list of the corresponding band.

A sending unit 1120 is configured to send the third frame to a first device.

Optionally, the pairwise cipher suite includes a pairwise cipher suite list.

Optionally, the third frame further carries request information used to request to perform a handshake in at least two bands.

Optionally, the request information includes at least two request bits, the at least two request bits are in a one-to-one correspondence with the at least two bands, and each request bit is used to request to perform a handshake in a corresponding band.

Optionally, each neighbor report element carries the request bit for the corresponding band.

Optionally, the request bit is located in one of the following items: a reserved bit of a basic service set identifier information field in the neighbor report element, an optional subelement field in the neighbor report element, or a newly added field in the neighbor report element.

Optionally, the apparatus 1100 further includes a receiving unit. The receiving unit is configured to obtain indication information, where the indication information is used to indicate whether the first device can perform the handshake with the apparatus in the at least two bands.

Figure 12:
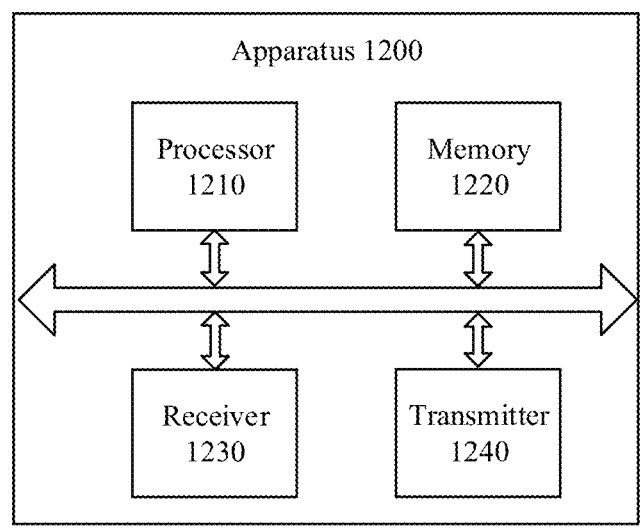
FIG. 12 is a block diagram of an example of another multi-band communications apparatus according to an embodiment of this application.

FIG. 12 is a schematic structural diagram of an apparatus 1200 according to an embodiment of this application. It should be understood that the apparatus 1200 shown in FIG. 12 is merely an example. The apparatus 1200 in this embodiment of this application may further include another module or unit, or may include modules having functions similar to those of the modules in FIG. 12.

The apparatus 1200 may include one or more processors 1210, one or more memories 1220, a receiver 1230, and a transmitter 1240. The receiver 1230 and the transmitter 1240 may be integrated together to obtain a transceiver. The memory 1220 is configured to store program code executed by the processor 1210. The processor 1210 may be integrated with the memory 1220, or the processor 1210 is coupled to one or more memories 1220, and is configured to invoke an instruction in the memory 1220.

In an embodiment, the receiver 1230 may be configured to implement an operation or a step that can be implemented by the receiving unit 810 in FIG. 8, the processor 1210 may be configured to implement an operation or a step that can be implemented by the processing unit 820 in FIG. 8, and the transmitter 1240 may be configured to implement an operation or a step that can be implemented by the sending unit 830 in FIG. 8.

In another embodiment, the receiver 1230 may be configured to implement an operation or a step that can be implemented by the receiving unit 910 in FIG. 9, and the processor 1210 may be configured to implement an operation or a step that can be implemented by the processing unit 920 in FIG. 9.

In another embodiment, the processor 1210 may be configured to implement an operation or a step that can be implemented by the processing unit 1010 in FIG. 10, the transmitter 1240 may be configured to implement an operation or a step that can be implemented by the sending unit 1020 in FIG. 10, and the receiver 1230 may be configured to implement an operation or a step that can be implemented by the receiving unit 1030 in FIG. 10.

In another embodiment, the processor 1210 may be configured to implement an operation or a step that can be implemented by the processing unit 1110 in FIG. 11, and the transmitter 1240 may be configured to implement an operation or a step that can be implemented by the sending unit 1120 in FIG. 11.

It should be understood that the apparatus 1200 may be specifically the first device or the second device in the foregoing embodiments, or may be a chip or a chip system. Correspondingly, the receiver 1230 and the transmitter 1240 may be a transceiver circuit of the chip. This is not limited herein. Specifically, the apparatus 1200 may be configured to perform steps and/or procedures corresponding to the first device or the second device in the foregoing method embodiments. Optionally, the memory 1220 may include a read-only memory and a random access memory, and provide an instruction and data to the processor. A part of the memory may further include a nonvolatile random access memory. For example, the memory may further store information about a device type. The processor 1210 may be configured to execute the instruction stored in the memory. In addition, when the processor 1210 executes the instruction stored in the memory, the processor 1210 is configured to perform steps and/or procedures corresponding to the first device or the second device in the foregoing method embodiments.

It should be understood that, the processor in this embodiment of this application may be a central processing unit (central processing unit, CPU), or the processor may be another general-purpose processor, a digital signal processor (digital signal processor, DSP), an application-specific integrated circuit (application specific integrated circuit, ASIC), a field programmable gate array (field programmable gate array, FPGA), another programmable logic device, a discrete gate, a transistor logic device, a discrete hardware component, or the like. The general-purpose processor may be a microprocessor, or the processor may be any conventional processor or the like.

It should be further understood that, the memory in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) used as an external cache. As an example instead of a limitation, many forms of random access memories (random access memory, RAM), for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM), may be used.

All or some of the foregoing embodiments may be implemented by using software, hardware, firmware, or any combination thereof. When software is used to implement the embodiments, the foregoing embodiments may be implemented all or partially in a form of a computer program product. The computer program product includes one or more computer instructions or computer programs. When the computer instructions or the computer programs are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually represents an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-band communications apparatus, comprising:
at least one processor;
a non-transitory computer-readable storage medium coupled to the at least one processor and storing programming instructions for execution by the at least one processor, wherein the programming instructions instruct the at least one processor to:
receive a first frame sent by a second device, wherein the first frame carries request information used to request to perform authentication, association in at least two bands, or reassociation in the at least two bands, and wherein the request information comprises indicators indicating one or more bands among the at least two bands for performing authentication, association, or reassociation; and
based on the request information carried in the first frame:
authenticate the multi-band communications apparatus;
associate the multi-band communications apparatus with the second device in the at least two bands; or
reassociate the multi-band communications apparatus with the second device in the at least two bands.

2. The multi-band communications apparatus according to claim 1, wherein the request information comprises at least two request bits, the at least two request bits are in a one-to-one correspondence with the at least two bands, and each request bit is used to request to perform authentication, association in a corresponding band, or reassociation in the corresponding band.

3. The multi-band communications apparatus according to claim 2, wherein the first frame comprises at least two first elements, and each first element carries a request bit for a respective band of the at least two bands.

4. The multi-band communications apparatus according to claim 3, wherein each first element is a multi-band element or a neighbor report element.

5. The multi-band communications apparatus according to claim 4, wherein when a respective first element of the at least two first elements is the multi-band element, the request bit for the respective band carried in the respective first element is located in one of a reserved bit of a multi-band control field in the multi-band element, a reserved bit of a multi-band connection capability field in the multi-band element, or a newly added field in the multi-band element.

6. The multi-band communications apparatus according to claim 4, wherein when a respective first element of the at least two first elements is the neighbor report element, the request bit for the respective band carried in the respective first element is located in one of a reserved bit of a basic service set identifier information field in the neighbor report element, an optional subelement field in the neighbor report element, or a newly added field in the neighbor report element.

7. The multi-band communications apparatus according to claim 1, wherein the programming instructions further instruct the at least one processor to:
send a second frame to the second device, wherein the second frame carries response information used to respond that the multi-band communications apparatus has authenticated, been associated with, or been reassociated with the second device.

8. A multi-band communications apparatus, comprising:
at least one processor;
a non-transitory computer-readable storage medium coupled to the at least one processor and storing programming instructions for execution by the at least one processor, wherein the programming instructions instruct the at least one processor to:
generate a first frame, wherein the first frame carries request information used to request to perform authentication, association in at least two bands, or reassociation in the at least two bands, and wherein the request information comprises indicators indicating one or more bands among the at least two bands for performing authentication, association, or reassociation; and
a transceiver, operable to send the first frame to a first device.

9. The multi-band communications apparatus according to claim 8, wherein the request information comprises at least two request bits, the at least two request bits are in a one-to-one correspondence with the at least two bands, and each request bit is used to request to perform authentication, association in a corresponding band, or reassociation in the corresponding band.

10. The multi-band communications apparatus according to claim 9, wherein the first frame comprises at least two first elements, and each first element carries a request bit for a respective band of the at least two bands.

11. The multi-band communications apparatus according to claim 10, wherein each first element is a multi-band element or a neighbor report element.

12. The multi-band communications apparatus according to claim 11, wherein when a respective first element of the at least two first elements is the multi-band element, the request bit for the respective band carried in the respective first element is located in one of a reserved bit of a multi-band control field in the multi-band element, a reserved bit of a multi-band connection capability field in the multi-band element, or a newly added field in the multi-band element.

13. The multi-band communications apparatus according to claim 11, wherein when a respective first element of the at least two first elements is the neighbor report element, the request bit for the respective band carried in the respective first element is located in one of: a reserved bit of a basic service set identifier information field in the neighbor report element, an optional subelement field in the neighbor report element, or a newly added field in the neighbor report element.

14. The multi-band communications apparatus according to claim 8, wherein the transceiver is further operable to:
receive a second frame sent by the first device, wherein the second frame carries response information used to respond that the first device has been authenticated, been associated with, or been reassociated with the multi-band communications apparatus.

15. A multi-band communications method, comprising:
receiving, by a first device, a first frame sent by a second device, wherein the first frame carries request information used to request to perform authentication, association in at least two bands, or reassociation in the at least two bands, and wherein the request information comprises indicators indicating one or more bands among the at least two bands for performing authentication, association, or reassociation; and based on the request information carried in the first frame:
- authenticating the first device;
- associating the first device with the second device in the at least two bands; or
- reassociating the first device with the second device in the at least two bands.

16. The multi-band communications method according to claim 15, wherein the request information comprises at least two request bits, the at least two request bits are in a one-to-one correspondence with the at least two bands, and each request bit is used to request to perform authentication, association in a corresponding band, or reassociation in the corresponding band.

17. The multi-band communications method according to claim 16, wherein the first frame comprises at least two first elements, and each first element carries a request bit for a respective band of the at least two bands.

18. The multi-band communications method according to claim 17, wherein each first element is a multi-band element or a neighbor report element.

19. The multi-band communications method according to claim 18, wherein when a respective first element of the at least two first elements is the multi-band element, the request bit for the respective band carried in the respective first element is located in one of a reserved bit of a multi-band control field in the multi-band element, a reserved bit of a multi-band connection capability field in the multi-band element, or a newly added field in the multi-band element.

20. The multi-band communications method according to claim 18, wherein when a respective first element of the at least two first elements is the neighbor report element, the request bit for the respective band carried in the respective first element is located in one of a reserved bit of a basic service set identifier information field in the neighbor report element, an optional subelement field in the neighbor report element, or a newly added field in the neighbor report element.

* * * * *